(12) United States Patent
Lund et al.

(10) Patent No.: US 10,202,678 B2
(45) Date of Patent: *Feb. 12, 2019

(54) METHOD AND STEEL COMPONENT

(75) Inventors: Thore Lund, Gothenburg (SE); Tobias Meyer, Mölndal (SE); Staffan Larsson, Göteborg (SE); Peter Neuman, Göteborg (SE)

(73) Assignee: Aktiebolaget SKF, Göteborg (SE)

( * ) Notice: Subject to any disclaimer, the term of this patent is extended or adjusted under 35 U.S.C. 154(b) by 821 days.

This patent is subject to a terminal disclaimer.

(21) Appl. No.: 14/122,215

(22) PCT Filed: May 22, 2012

(86) PCT No.: PCT/SE2012/000079
§ 371 (c)(1),
(2), (4) Date: Mar. 20, 2014

(87) PCT Pub. No.: WO2012/161635
PCT Pub. Date: Nov. 29, 2012

(65) Prior Publication Data
US 2014/0209214 A1   Jul. 31, 2014

(30) Foreign Application Priority Data
May 25, 2011   (SE) ...................................... 1100418

(51) Int. Cl.
*C21D 9/36* (2006.01)
*C21D 9/40* (2006.01)
(Continued)

(52) U.S. Cl.
CPC .................. *C23C 8/80* (2013.01); *C21D 1/20* (2013.01); *C21D 9/36* (2013.01); *C21D 9/40* (2013.01);
(Continued)

(58) Field of Classification Search
None
See application file for complete search history.

(56) References Cited

U.S. PATENT DOCUMENTS 5,439,300 A * 8/1995 Hirakawa ................ C21D 9/40
                                                    384/492
5,855,531 A * 1/1999 Mitamura ............... F16H 15/38
                                                    384/625
(Continued)

FOREIGN PATENT DOCUMENTS

CN          1214368 A      4/1999
CN        101994120 A      8/2009
(Continued)

OTHER PUBLICATIONS

Machine translation of JP2009052119, pp. 1-20.*
ASM Materials Information for JIS SNCM625, 1 page, data retrieed Jun. 3, 2016.*

*Primary Examiner* — Colleen P Dunn
(74) *Attorney, Agent, or Firm* — Bryan Peckjian; SKF USA Inc. Patent Dept.

(57) ABSTRACT

Method for heat treating a steel component (28, 36) comprising the steps of: a) carbonitriding the steel component (28, 36) at a temperature of 930-970° C., b) cooling the steel component (28, 36), d) re-heating the steel component (28, 36) to a temperature of 780-820° C. and d) quenching the steel component (28, 36). The method comprises the step of either e) performing a bainite transformation at a temperature just above the martensite formation temperature, transforming 25-99% of the austenite into bainite at the temperature and then increasing the temperature to speed up the transformation of the remaining austenite into bainite, or f) holding the steel component (28, 36) at an initial temperature ($T_1$) above the initial martensite formation temperature (Ms), and lowering the initial temperature ($T_1$) to a tem-
(Continued)

perature ($T_2$) that is below the initial martensite formation temperature (Ms) but above the actual martensite formation temperature during the bainite transformation.

18 Claims, 4 Drawing Sheets

(51) Int. Cl.

| | | |
|---|---|---|
| C22C 38/00 | (2006.01) | |
| C23C 8/80 | (2006.01) | |
| C21D 1/20 | (2006.01) | |
| C22C 38/02 | (2006.01) | |
| C22C 38/04 | (2006.01) | |
| C22C 38/22 | (2006.01) | |
| C22C 38/24 | (2006.01) | |
| F16C 33/32 | (2006.01) | |
| F16C 33/64 | (2006.01) | |
| C23C 8/32 | (2006.01) | |
| C21D 1/18 | (2006.01) | |

(52) U.S. Cl.
CPC ............ *C22C 38/002* (2013.01); *C22C 38/02* (2013.01); *C22C 38/04* (2013.01); *C22C 38/22* (2013.01); *C22C 38/24* (2013.01); *C23C 8/32* (2013.01); *F16C 33/32* (2013.01); *F16C 33/64* (2013.01); *C21D 1/18* (2013.01); *C21D 2211/002* (2013.01); *C21D 2221/10* (2013.01); *F16C 2360/31* (2013.01)

(56) References Cited

U.S. PATENT DOCUMENTS

| 6,149,734 | A | | 11/2000 | Isogai et al. | |
|---|---|---|---|---|---|
| 6,149,743 | A | * | 11/2000 | Lund | C21D 1/20 |
| | | | | | 148/579 |
| 6,203,634 | B1 | | 3/2001 | Volkmuth | |
| 6,325,867 | B1 | * | 12/2001 | Okita | C21D 1/78 |
| | | | | | 148/226 |
| 6,440,232 | B1 | * | 8/2002 | Takemura | F16H 15/38 |
| | | | | | 148/319 |
| 6,659,909 | B2 | * | 12/2003 | Okita | F16H 15/38 |
| | | | | | 476/40 |
| 6,666,792 | B2 | * | 12/2003 | Yoshikawa | C23C 8/22 |
| | | | | | 148/319 |
| 6,770,152 | B1 | * | 8/2004 | Okita | C21D 6/04 |
| | | | | | 148/319 |
| 6,843,867 | B1 | | 1/2005 | Foerster et al. | |
| 7,462,128 | B2 | * | 12/2008 | Uchiyama | C23C 8/02 |
| | | | | | 384/492 |
| 7,641,742 | B2 | * | 1/2010 | Ohki | C21D 9/40 |
| | | | | | 148/219 |
| 8,714,831 | B2 | * | 5/2014 | Mori | C21D 1/74 |
| | | | | | 148/218 |
| 2003/0123769 | A1 | | 7/2003 | Ohki | |
| 2008/0019522 | A1 | | 8/2008 | Proctor | |
| 2008/0190522 | A1 | * | 8/2008 | Volkmuth | C21D 1/18 |
| | | | | | 148/664 |

FOREIGN PATENT DOCUMENTS

| DE | 102007044950 B3 | | 1/2009 |
|---|---|---|---|
| EP | 0896068 A1 | | 7/1998 |
| EP | 0896068 A1 | | 2/1999 |
| EP | 1273672 | * | 5/2006 |
| JP | 61084319 A | | 4/1986 |
| JP | 2007262505 A | | 10/2007 |
| JP | 2009052119 | * | 3/2009 |
| JP | 2009052119 A | | 3/2009 |
| WO | WO00/77265 | * | 12/2000 |
| WO | 2010134867 A1 | | 11/2010 |
| WO | WO2010/134867 | * | 11/2010 |

* cited by examiner

METHOD AND STEEL COMPONENT

CROSS-REFERENCE

This application is the U.S. National Stage of International Application No. PCT/SE2012/000079 filed on May 22, 2012, which claims priority to Swedish patent application no. 1100418-1 filed on May 25, 2011.

TECHNICAL FIELD

The present invention concerns a method for heat treating a steel component. The present invention also concerns a steel component that has been subjected to such a method.

BACKGROUND OF THE INVENTION

The nacelle of a wind turbine usually comprises a plurality of bearings, for a rotor shaft, gearbox, electrical generator, yaw gearbox, yaw slewing table, blade pitch revolving seat and/or hydraulic pump for example. The bearing loads and rotating speeds to which such bearings are subjected during their use vary considerably due to changing wind speeds and directions. At wind speeds below the cut-in wind speed (i.e. the minimum wind speed required for power generation) a rotor shaft will idle, resulting in low speed, low load operation. At wind speeds above the cut-in speed the rotor shaft will rotate, resulting in high speed, high load operation. The bearings of a wind turbine may therefore be subjected to repeated start, acceleration, deceleration and stop operations. Furthermore, the bearing may be exposed to the elements and airborne particles, such as sand particles, and will therefore need to be of high strength and hardness.

Carbonitriding is a metallurgical surface modification technique that is used to increase the surface hardness of metal components, thereby reducing the wear of the components during use. During the carbonitriding process, atoms of carbon and nitrogen diffuse interstitially into the metal, creating barriers to slip and increasing the hardness near the surface, typically in a layer that is 0.1 to 0.3 mm thick. Carbonitriding is usually carried out a temperature of 850-860° C. Carbonitriding is normally used to improve the wear resistance of steel components comprising low or medium carbon steel, and not high carbon steel. Although steel components comprising high carbon steel are stronger, they have been found to be more susceptible to cracking in certain applications.

SUMMARY OF THE INVENTION

An object of the invention is to provide an improved method for heat treating a steel component.

This object is achieved by a method that comprises the steps of:
a) carbonitriding the steel component at a temperature of 930-970° C., i.e. a temperature higher than the usual carbonitriding temperature, in order to dissolve all carbides,
b) cooling the steel component to a temperature below the $A_1$ transformation temperature,
c) re-heating the steel component to a temperature of 780-820° C., i.e. a temperature higher than the $A_1$ transformation temperature and lower than the carbonitriding temperature, and
d) quenching the steel component, in a quenching medium bath, such as a salt bath, polymer solution or oil, and either e) performing a bainite transformation at a temperature just above the martensite formation temperature, transforming 25-99% of the austenite into bainite at the temperature and then increasing the temperature to speed up the transformation of the remaining austenite into bainite, or f) holding the steel component at an initial temperature ($T_1$) above the initial martensite formation temperature (Ms), preferably just above the initial martensite formation temperature (Ms), i.e. within 50° C. and preferably with 20° C. of the initial martensite formation temperature (Ms). This depresses the actual martensite formation temperature. The method then comprises the step of lowering the initial temperature ($T_1$) to a temperature ($T_2$) that is below the initial martensite formation temperature (Ms) but above the actual martensite formation temperature during the bainite transformation. Martensitic transformation is thereby avoided at all times. According to an embodiment of the invention step f) comprises subsequently raising the temperature from ($T_2$) to a temperature ($T_3$) that is above the initial martensite formation temperature (Ms) during the bainite transformation.

Such a method, in which a steel component is subjected to either step e) or step f) after a carbonitriding process, has been found to counteract brittleness caused by carbonitriding. Step e) and step f) have namely been found to create compressive stresses at the surface of a carbonitrided steel component, which increases its fatigue strength and service life since it is more difficult for cracks to initiate or propagate in a compressively stressed zone. Compressive stresses are namely beneficial in increasing resistance to fatigue failures, corrosion fatigue, stress corrosion cracking, hydrogen assisted cracking, fretting, galling and erosion caused by cavitation.

By firstly carbonitriding the steel component, the surface of the steel will have a Rockwell hardness HRC of at least 60 and comprise a considerable quantity of fine carbides, i.e. carbides having a maximum longitudinal dimension of 0.2-0.3 µm. Changing the microstructure of the surface of the steel component in this way improves it wear resistance and enhances its ability to relax stress concentration at the edges of any indentations in its surface. By carrying out the carbonitiriding step at a temperature in the given temperature range, the steel component may be provided with a carbonitrided layer having a depth measured from the surface of the steel component of 0.3-1.2 mm, whereby the carbonitrided layer contains only carbides having a maximum longitudinal dimension of 0.2-0.3 µm and no carbides having a longer maximum longitudinal dimension.

Using method step e) it is then possible to increase the fatigue strength of the carbonitrided steel component and provide bainite hardening which reduces the bainite transformation time without reducing the hardness. Using method step e) instead of a conventional isothermal bainite transformation allows the process time required to achieve a given hardness to be shortened, or, for a given transformation time, for the hardness to be increased. According to an embodiment of the invention step e) comprises transforming 50-90% of the austenite to bainite before increasing the temperature for speeding up the transformation of the remaining austenite into bainite.

Alternatively, using method step f) instead of a conventional isothermal bainite transformation, it is possible to increase the fatigue strength of the carbonitrided steel component and to increase the hardness of the bainite formed during the bainite transformation for a given transformation time.

The hardness of the bainite formed is almost the same as the hardness of martensite while the advantages of a bainitic structure over a martensitic structure (e.g. higher toughness, higher crack propagation resistance, etc.) are maintained. Furthermore, reducing the bainite transformation temperature during the bainite transformation reduces manufacturing costs as compared to isothermal bainite transformation, and consequently makes the bainite transformation more energy efficient. Method step f) is based on the insight that the martensite formation temperature (Ms) decreases during the bainite transformation and that this may be utilized to lower the bainite transformation temperature to a temperature below the initial martensite formation temperature (Ms) during the bainite transformation in order to form harder bainite.

According to a further embodiment of the invention step f) comprises transforming at least 15-40% of the austenite into bainite at a temperature ($T_1$) above the initial martensite formation temperature (Ms) before lowering the temperature ($T_1$) to a temperature ($T_2$) below the initial martensite formation temperature (Ms) but above the actual martensite formation temperature.

According to an embodiment of the invention step f) comprises maintaining the temperature ($T_3$) above the initial martensite formation temperature (Ms) until complete bainite transformation is achieved. Alternatively, a steel component may be quenched after a bainite transformation of 85%, 90% or 95% has been achieved.

According to another embodiment of the invention step a) comprises carbonitriding the steel component at a temperature of 930-970° C. for 5-10 hours.

According to a further embodiment of the invention the steel component comprises steel with a carbon content of 0.6 to 1.20 weight %, such as a high carbon bearing steel such as SAE 52100/Gd3 or Gd2.

According to an embodiment of the invention the steel component comprises steel with a carbon content of 0.2 to 0.6 weight %, such as ASTM A516 Grade 55.

According to an embodiment of the invention the steel that contains, by weight, max 20 ppm S and max 15 ppm O and includes sulphide inclusions whereby less than 5% of the sulphide inclusions contain encapsulated or embedded oxide inclusions.

According to another embodiment of the invention the steel comprises max 10 ppm O or 30 max 8 ppm O.

According to a further embodiment of the invention the steel comprises an element selected from the group: Ca, Mg, Te or a lanthanide, such as Ce, Pr, Nd, Pm, Sm, Eu, Gd, Tb, Dy, Ho, Er, Tm, Yb or Lu. According to a further embodiment of the invention the steel comprises, by weight, 10-30 ppm of an element selected from the group above.

The addition of such an element to steel after the sulphur content has been reduced to a level substantially of the same order as the oxygen content, will reduce the total number of sulphide inclusions remaining in the steel and/or it will modify the shape of the remaining inclusions into one that is less detrimental to mechanical properties in the final bearing component, (tellurium for example spherodizes the sulphide inclusions). It has namely been found that the addition of such an element to steel will result in less than 5% of the sulphide inclusions containing encapsulated or embedded oxide inclusions. The addition of such an element will also result in all of the sulphide inclusions having an aspect ratio of less than 3:1 (i.e. the ratio of the inclusion's largest diameter to the inclusion's shortest diameter) and in the maximum sulphide inclusion length being 125 μm at a Reduced Variate equal to 3 evaluated using the ASTM E2283-03 Extreme Value Analysis Standard. Such sulphide inclusions are less damaging to a steel component as regards its fatigue properties. Furthermore, the absence of sulphide inclusions having an aspect ratio greater than 3:1 and having a maximum length greater than 125 μm gives the steel more uniform properties in all directions and thereby reduces directional anisotropy in the steel.

According to a further embodiment of the invention the steel component constitutes at least part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, or a component for an application in which it is subjected to alternating Hertzian stresses, such as rolling contact or combined rolling and sliding and/or an application that requires high wear resistance and/or increased fatigue and tensile strength. The component may include or constitute gear teeth, a cam, shaft, bearing, fastener, pin, automotive clutch plate, tool, a die or any part of a gearbox (such as a planetary gearbox, adjustable speed drive or continuously variable transmission).

According to an embodiment of the invention, as a result of the method, the steel component is provided with a carbonitrided layer having a thickness (d) of 0.3-1.2 mm whereby all of the carbides in the carbonitrided layer have a maximum longitudinal dimension of 0.2-0.3 μm.

According to another embodiment of the invention the steel component is provided with a carbonitrided layer having a ratio (d:D) of depth (d) of the carbonitrided layer measured from the surface of the steel component to maximum transverse dimension (D) of the steel component of 1:4000 to 1:17,000 or more. The method according to the present invention may be used to provide a component of any size with a carbonitrided layer. The method is however particularly suitable for providing a large component, having a maximum transverse dimension of a few meters for example, with a carbonitrided layer since the higher carbonitriding temperature provides a carbonitrided layer with greater depth, whereby part of the carbonitrided layer may be ground away during the manufacture of the component without substantially affecting the wear resistance of the component.

According to a further embodiment of the invention, as a result of the method, the steel component has a substantially bainitic structure and a hardness of at least 62 HRC.

The present invention also concerns a steel component that has been subjected to a method according to a method according to any of the embodiments of the invention. The method according to the present invention may be used to treat a steel component for use in a wind turbine application. The method and steel component are not however exclusively intended to treat a steel component for use in a wind turbine application but may be used in any application that requires a steel component with high wear resistance and/or increased fatigue and tensile strength. The component may for example be used in automotive marine, metal producing or other machine applications.

BRIEF DESCRIPTION OF THE DRAWINGS

The present invention will hereinafter be further explained by means of non-limiting examples with reference to the appended figures where.

It should be noted that the drawings have not been drawn to scale and that the dimensions of certain features have been exaggerated for the sake of clarity.

DETAILED DESCRIPTION OF EMBODIMENTS

Figure 1:
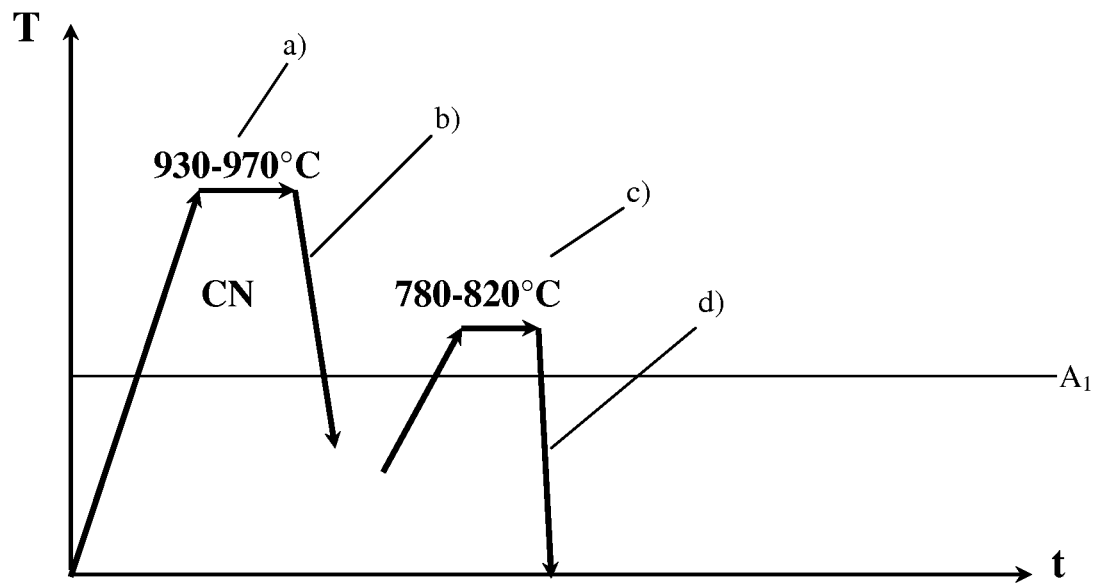
FIG. 1 shows steps a)-d) of a method according to an embodiment of the present invention.

FIG. 1 shows steps a)-d) of a method according to the present invention. The illustrated method comprises the steps of a) carbonitriding a steel component at a temperature of 930-970° C. for 5-10 hours. The process environment may be provided by the introduction of methane/propane/natural gas (for carbon) and ammonia (for nitrogen) into a furnace in the presence of a controlled carrier gas. By maintaining the proper ratios of the working gases, the component is provided with a thin carbonitrided layer of carbon- and nitrogen-rich steel.

According to an embodiment of the invention the method includes supplying a higher concentration of ammonia at the beginning of the carbonitriding step a) to boost the carbonitriding process. For example, 9.5% ammonia may be used initially; this may be lowered to 6.5% ammonia and then 0%. 9.5% ammonia may be used for about 70% of the carbonitriding step a).

The component is then cooled to a temperature below the $A_1$ transformation temperature (step b)) and then re-heated to a temperature of 780-820° C. (step c)), i.e. a temperature higher than the $A_1$ transformation temperature and lower than the carbonitriding temperature, and is subsequently quenched (step d)) to achieve the full case hardness. Quenching may be carried out in an oil or salt bath with bath temperatures selected to achieve the optimum properties with acceptable levels of dimensional change. Hot oil/salt bath quenching can be used to minimize distortion of intricate parts.

Figure 2:
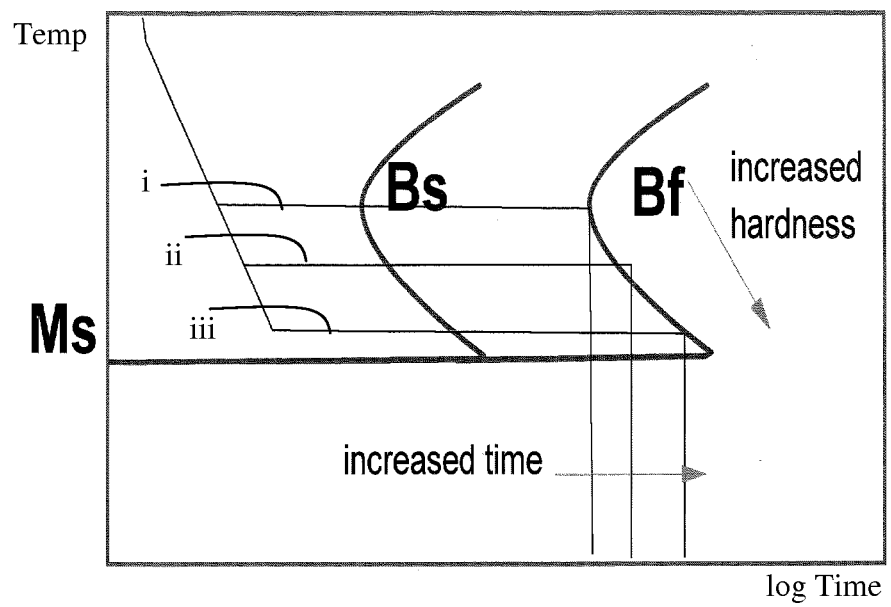
FIG. 2 shows a bainite transformation method according to the prior art.

FIG. 2 shows a plot of temperature versus log time for three conventional bainite transformation heat treatments i, ii, iii. Ms denotes the temperature at which martensite starts to form. Bs denotes the start of bainite transformation and Bf denotes the end of bainite transformation. Steel is firstly austenitized and then quenched. The steel is then isothermally tempered by heating at a temperature just above the martensite formation temperature (Ms).

Conventionally, in order to obtain maximum hardness, a tempering temperature close to the initial martensite formation temperature (Ms) has been used (plot iii in FIG. 2). However, this results in a very long transformation time which is not economical. The transformation time may be reduced by increasing the temperature at which the steel is tempered (plot i in FIG. 2). However, this will reduce the hardness of the bainite formed.

Figure 3:
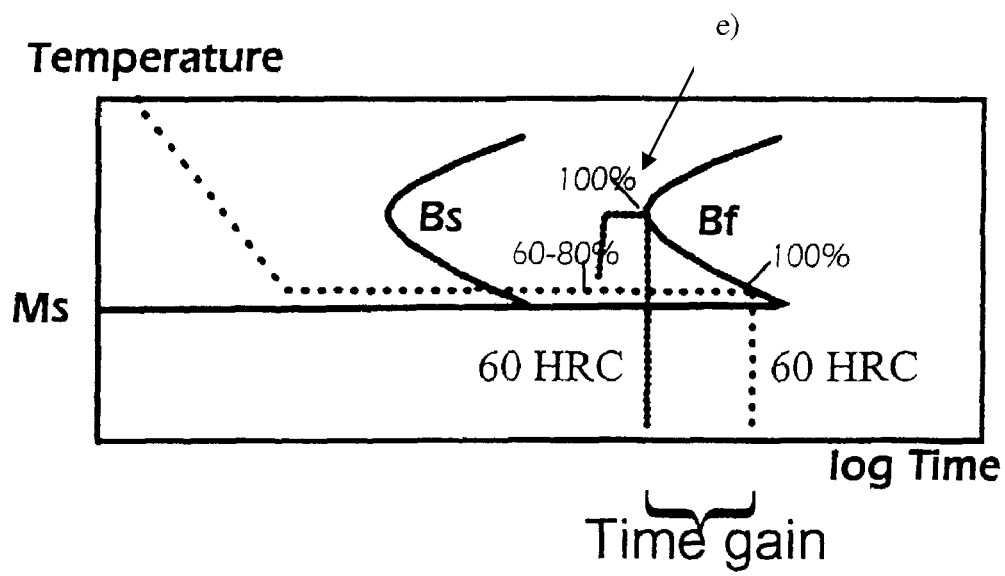
FIG. 3 shows a bainite transformation according to step e) of a method according to an embodiment of the present invention.

FIG. 3 shows a bainite transformation according to step e) of a method according to an embodiment of the present invention, in which a bainite transformation is performed on a steel component that has been subjected to steps a)-d) of a method according to an embodiment of the present invention, at a temperature just above the martensite formation temperature (Ms). 60-80% of the austenite is transformed into bainite at that temperature and then the temperature is increased to speed up the transformation of the remaining austenite into bainite. The dotted line in FIG. 3 shows a conventional isothermal bainite transformation which gives the same hardness but requires a significantly longer transformation time.

Figure 4:
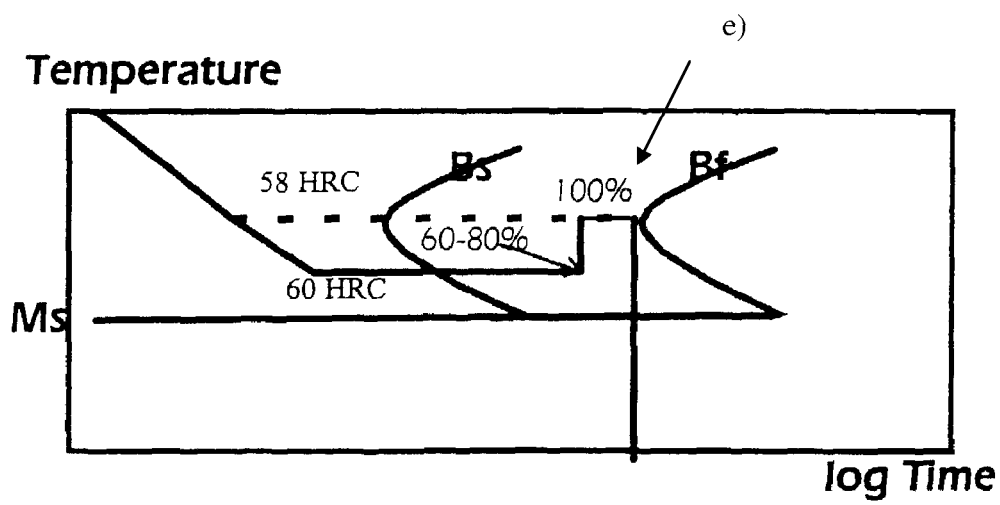
FIG. 4 shows a bainite transformation according to step e) of a method according to an embodiment of the present invention, p

FIG. 4 shows a bainite transformation according to step e) of a method according to an embodiment of the present invention, whereby the dotted line shows a conventional isothermal bainite transformation with the same transformation time but which gives a significantly lower hardness.

Figure 5:
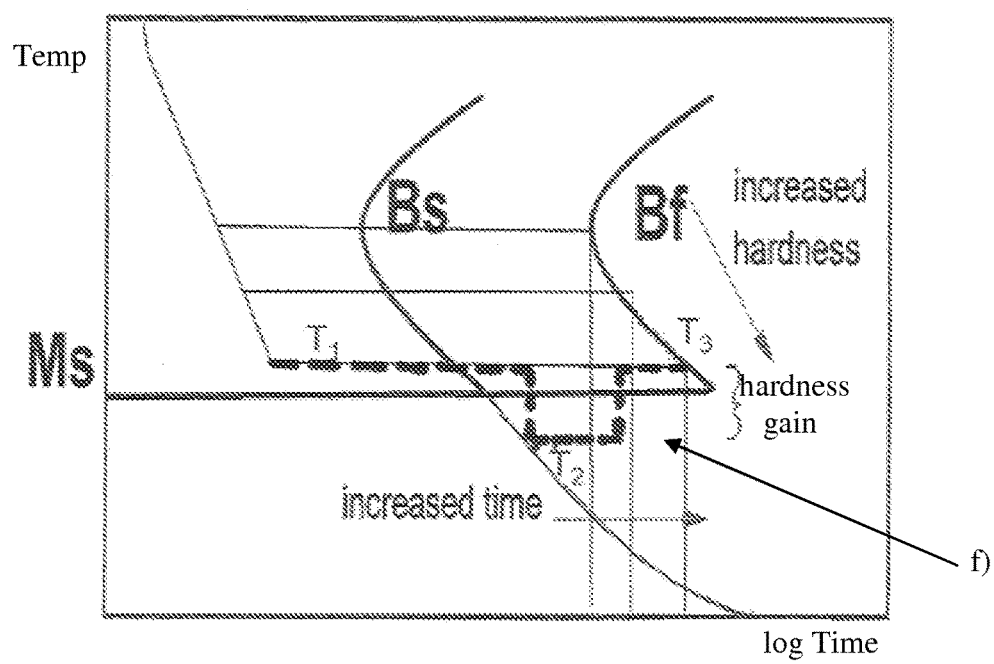
FIG. 5 shows a bainite transformation according to step f) of a method according to an embodiment of the present invention.

FIG. 5 shows a bainite transformation according to step f) of a method according to an embodiment of the present invention in which a steel component, that has been subjected to steps a)-d) of a method according to an embodiment of the present invention, is held at an initial temperature ($T_1$) above the initial martensite formation temperature (Ms). The initial temperature ($T_1$) is then lowered to a temperature ($T_2$) that is below the initial martensite formation temperature (Ms) but above the actual martensite formation temperature during the bainite transformation. According to an embodiment of the invention 50-90% of the austenite is transformed to bainite before increasing the temperature to $T_3$ to speed up the transformation of the remaining austenite to bainite.

After a steel component has been subjected to method steps a), b), c), d), and e), or method steps a), b), c), d), and f) the component is cooled to room temperature and may then be used in any application in which it is likely to be subjected to stress, strain, impact and/or wear under a normal operational cycle.

Figure 6:
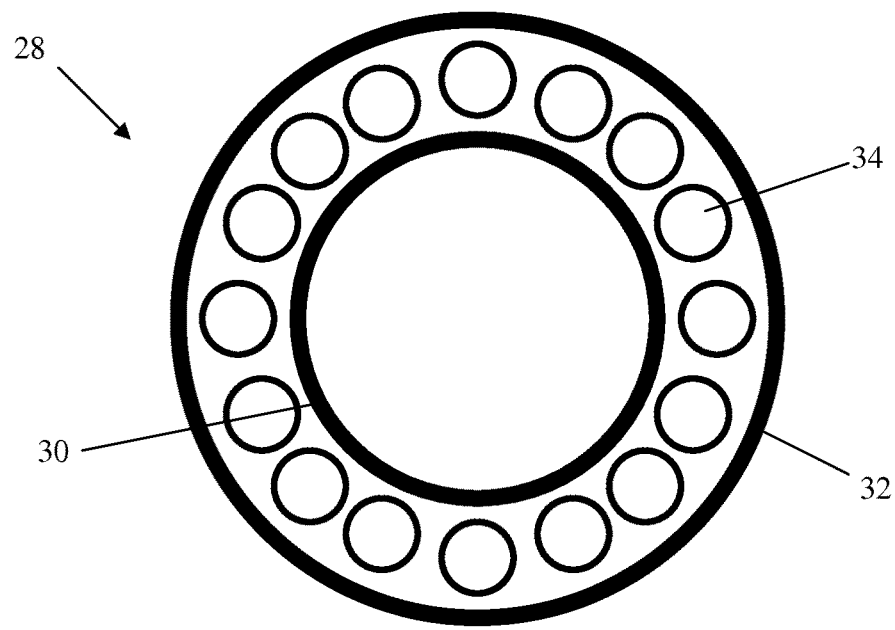
FIGS. 6 & 7 show steel components according to embodiments of the invention.

FIG. 6 shows an example of a steel component according to an embodiment of the invention, namely a rolling element bearing 28 that may range in size from 10 mm diameter to a few meters diameter and have a load-carrying capacity from a few tens of grams to many thousands of tonnes. The bearing 28 according to the present invention may namely be of any size and have any load-carrying capacity. The bearing 28 has an inner ring 30 and an outer ring 32 and a set of rolling elements 34. The inner ring 30, the outer ring 32 and/or the rolling elements 34 of the rolling element bearing 28, and preferably at least part of the surface of all of the rolling contact parts of the rolling element bearing 28 may be subjected to a method according to the present invention.

Figure 7:
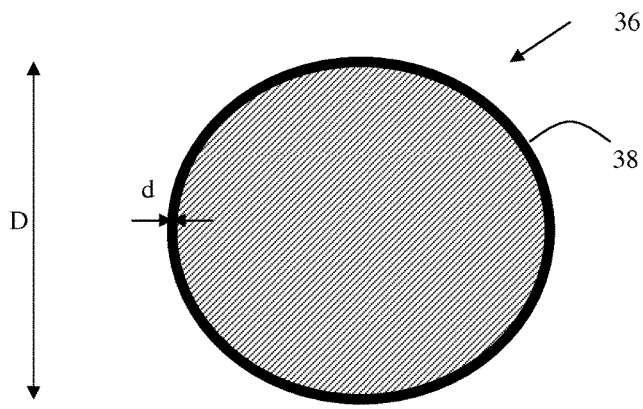

FIG. 7 shows a component 36, namely a shaft shown in cross section, according to an embodiment of the invention. The component 36 has been provided with a carbonitrided layer 38 on its outer surface using a method according to an embodiment of the invention. The depth of the carbonitrided layer 38 measured from the surface of the component 36 is d and the maximum transverse dimension of the component 36 (the diameter of the shaft in this case) is D. The ratio (d:D) of the thickness d of the carbonitrided layer 38 to the maximum transverse dimension D of the component 36 is 1:4000-17,000 or more.

A steel component according to the present invention may be manufactured from steel having the following composition:

0.70-0.95 weight-% carbon
0.05-1.5 weight-% silicon
0.15-0.50 weight-% manganese
0.5-2.5 weight-% chromium 0.10-1.5 weight-% molybdenum
max. 0.25 weight-% vanadium
the remainder being Fe, and normally occurring impurities comprising 10-30 ppm Ca, max 20 ppm S and max 15 ppm O, preferably max 10 ppm O or most preferably max 8 ppm O.

About 1% of the sulphide inclusions of such steel contains encapsulated or embedded oxide inclusions. On the contrary, in standard steel, about 80% of the steel's sulphide inclusions contain encapsulated or embedded oxide inclusions. It has been found that the fatigue strength (measured in rotating beam tests at 950 MPa) of a steel component according to the present invention is substantially higher than the fatigue strength of standard steel.

Figure 8:
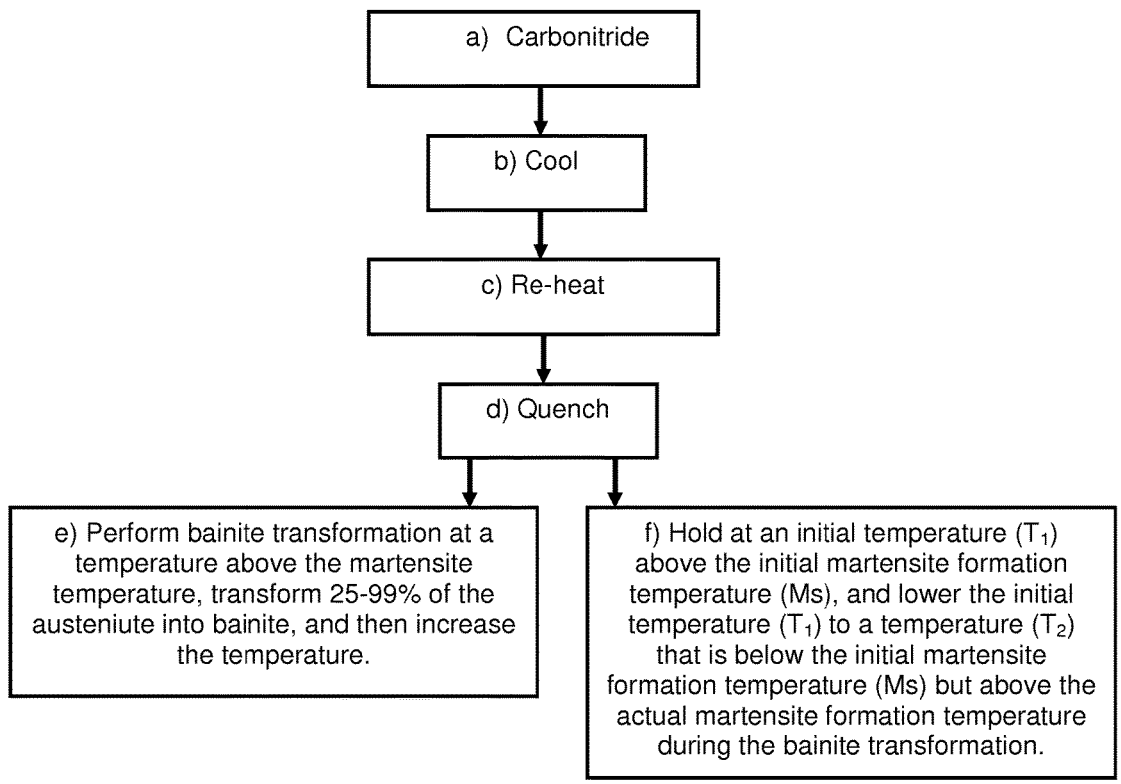
FIG. 8 shows a flow chart of a method according to the present invention.

FIG. 8 is a flow diagram which outlines the steps a)-f) of a method according to an embodiment of the present invention.

Further modifications of the invention within the scope of the claims would be apparent to a skilled person.

The invention claimed is:

1. A method for heat treating a steel component comprising the steps of:
    a) carbonitriding the steel component at a temperature of 930-970° C.,
    b) cooling the steel component,
    c) re-heating the steel component to a temperature of 780-820° C.,
    d) quenching the steel component,
    and e) holding the steel component at an initial temperature ($T_1$) above the initial martensite formation temperature (Ms), and lowering the initial temperature ($T_1$) to a temperature ($T_2$) that is below the initial martensite formation temperature (Ms) but above the actual martensite formation temperature during the bainite transformation.

2. The method according to claim 1, wherein step e) further comprises subsequently raising the temperature from ($T_2$) to a temperature ($T_3$) that is above the initial martensite formation temperature (Ms) during the bainite transformation.

3. The method according to claim 2, wherein step e) further comprises the step of transforming at least 15-40% of the austenite into bainite at a temperature ($T_1$) above the initial martensite formation temperature (Ms) before lowering the temperature ($T_1$) to a temperature ($T_2$) below the initial martensite formation temperature (Ms) but above the actual martensite formation temperature.

4. The method according to claim 2, wherein step e) further comprises the step of maintaining the temperature ($T_3$) above the initial martensite formation temperature (Ms) until complete bainite transformation is achieved.

5. The method according to claim 4 wherein step a) further comprises carbonitriding the steel component at a temperature of 930-970° C. for 5-10 hours.

6. The method according to claim 5, wherein the steel component further comprises steel with a carbon content of 0.6 to 1.20 weight %.

7. The method according to claim 5, wherein the steel component further comprises steel with a carbon content of 0.2 to 0.6 weight %.

8. The method according to claim 7, wherein the steel comprises, by weight, max 20 ppm S and max 15 ppm O and includes sulphide inclusions and less than 5% of the sulphide inclusions contain encapsulated or embedded oxide inclusions.

9. The method according to claim 8, wherein the maximum length of the sulphide inclusions is 125 mm at a Reduced Variate equal to 3.

10. The method according to claim 9, wherein the steel comprises max 10 ppm O or max 8 ppm O.

11. The method according to claim 9, wherein all of the sulphide inclusions have an aspect ratio less than 3:1.

12. The method according to claim 11, wherein the steel comprises an element selected from the group: Ca, Mg, Te, Ce, Pr, Nd, Pm, Sm, Eu, Gd, Tb, Dy, Ho, Er, Tm, Yb or Lu.

13. The method according to claim 12, wherein the steel comprises, by weight, 10-30 ppm of said element.

14. The method according to claim 13, wherein the steel component constitutes at least part of one of the following: a ball bearing, a roller bearing, a needle bearing, a tapered roller bearing, a spherical roller bearing, a toroidal roller bearing, a ball thrust bearing, a roller thrust bearing, a tapered roller thrust bearing, a wheel bearing, a hub bearing unit, a slewing bearing, a ball screw, and a component for an application in which it is subjected to alternating Hertzian stresses, such as rolling contact or combined rolling and sliding and/or an application that requires high wear resistance and/or increased fatigue and tensile strength.

15. The method according to claim 14, wherein the steel component is provided with a carbonitrided layer having a thickness (d) of 0.3-1.2 mm whereby all of the carbides in the carbonitrided layer have a maximum longitudinal dimension of 0.2-0.3 mm.

16. The method according to claim 15, wherein the steel component is provided with a carbonitrided layer having a ratio (d:D) of depth (d) of the carbonitrided layer measured from the surface of the steel component to maximum transverse dimension (D) of the steel component of 1:4000 to 1:17,000 or more.

17. The method according to claim 16, wherein the steel component has a substantially bainitic structure and a hardness of at least 62 HRC.

18. A method for heat treating a steel component comprising the steps of:
    a) carbonitriding the steel component at a temperature of 930-970° C.,
    b) after step a), cooling the steel component,
    c) after step b), re-heating the steel component to a temperature of 780-820° C.,
    d) after step c), quenching the steel component,
    e) after step d) holding the steel component at an initial temperature ($T_1$) above the initial martensite formation temperature (Ms), and lowering the initial temperature ($T_1$) to a temperature ($T_2$) that is below the initial martensite formation temperature (Ms) but above the actual martensite formation temperature during the bainite transformation.

* * * * *